United States Patent

Itoh et al.

[15] 3,661,727

[45] May 9, 1972

[54] METHOD OF MANUFACTURING SEMICONDUCTOR DEVICES

[72] Inventors: Yokichi Itoh; Nobuhiko Shirasaka, both of Hachioji; Shoji Tauchi, Kokubunji, all of Japan

[73] Assignee: Kabushiki Kaisha Hitachi Seisakusko, Tokyo-to, Japan

[22] Filed: Jan. 29, 1970

[21] Appl. No.: 7,319

Related U.S. Application Data

[63] Continuation of Ser. No. 490,597, Sept. 27, 1965, abandoned.

[30] Foreign Application Priority Data

Oct. 1, 1964 Japan....................................39/55667

[52] U.S. Cl.....................................204/32 S, 117/8, 156/17, 204/15, 204/143 GE

[51] Int. Cl...........................................................C23b 3/04

[58] Field of Search......................29/589; 117/8; 156/12, 17; 204/15, 32 R, 32 S, 38, 38.1, 42, 56, 143 GE, 35 N

[56] References Cited

UNITED STATES PATENTS

| | | | |
|---|---|---|---|
| 2,861,931 | 11/1958 | Faust, Jr. | 204/141 |
| 2,885,608 | 5/1959 | Bradley | 317/234 |
| 2,958,633 | 11/1960 | Claussen | 204/32 |
| 2,995,473 | 8/1961 | Levi | 117/201 |
| 3,075,892 | 1/1963 | John et al. | 204/15 |
| 3,081,418 | 3/1963 | Manintueld et al. | 317/128 |
| 3,096,259 | 7/1963 | Williams | 204/15 |
| 3,160,534 | 12/1964 | Orashnik | 148/177 |
| 3,226,611 | 12/1965 | Haenichen | 317/234 |
| 3,237,271 | 3/1966 | Arnold et al. | 29/25.3 |
| 3,272,748 | 9/1966 | Szkudlapski | 252/79.3 |
| 2,814,589 | 11/1957 | Waltz | 204/32 S |
| 2,802,159 | 8/1957 | Stump | 317/235 |
| 3,171,762 | 3/1965 | Rutz | 148/175 |
| 3,234,058 | 2/1966 | Marinace | 156/17 X |
| 3,388,000 | 6/1968 | Waters et al. | 156/17 X |

FOREIGN PATENTS OR APPLICATIONS

| | | | |
|---|---|---|---|
| 701,897 | 1/1965 | Canada | 204/143 |

*Primary Examiner*—John H. Mack
*Assistant Examiner*—W. I. Solomon
*Attorney*—H. Edward Mestern, Ernest F. Marmorek and Jordan B. Bierman

[57] ABSTRACT

The method of plating a metal layer on a selected, clean surface of a semiconductor substrate with a metal provides for forming at first a layer of silicon dioxide on the substrate surface by the high temperature oxidation method, then forming a hollow on one part thereof, thereafter immersing the semiconductor substrate in a mixture of an etching solution and a metal-plating solution for a limited period of time sufficient for only a part of the silicon dioxide film positioning on this hollow part to dissolve and to expose a clean surface of the substrate and sufficient for a metal layer of a certain thickness to be metal-plated on the clean surface.

9 Claims, 7 Drawing Figures

Yokichi Itoh,
Nobuhiko Shirasaka
and Shoji Tauchi, INVENTORS:

BY Marmorek & Bierman,
THEIR ATTORNEYS.

METHOD OF MANUFACTURING SEMICONDUCTOR DEVICES

This is a continuation of application Ser. No. 490,597, filed Sept. 27, 1965, and now abandoned.

BACKGROUND OF THE INVENTION

The present invention relates to a new method of electroplating a metal layer on a clean semiconductor wafer surface.

As a condition for obtaining good semiconductor-to-metal contact in the process of forming a metal layer on a semiconductor wafer surface, the necessity of using a clean surface of the wafer is recognized in general. According to the prior practice, the following two methods have been used, in general, to obtain such contacts.

The first method is to cleave the semiconductor material mechanically in a high vacuum, and a metal is deposited by evaporation on the cleaved surface immediately after cleavage without breaking the vacuum. Means such as a blade or a weight etc. is used in conjunction with a mechanical force such as gravity force, magnetic force, or spring force in the cleaving process.

In the second method, to obtain a clean semiconductor surface, the surface is etched by dipping in a solution of acid or alkali which in some cases contains an oxidizer or retarder; and after a rinsing out and drying process, a metallic layer is deposited on the surface by evaporation or plating. In the etching process, such procedure as use of mainly an alkali solution and passing of electric current to perform local etching is also practiced.

In the said first method, cleavage occurs along the slip plane of the semiconductor single crystal, and the cleaved surface thus obtained is not a perfect plane, and also it is difficult to obtain a cleaved surface of large area. Moreover, mechanical damage also often occurs.

The main reason why this process has not been utilized in general is that the process of cleaving and evaporation must be performed in a vacuum; that is, although precision is required in the above operation, it is very difficult to achieve because said process is carried out in a vacuum and requires high technical skill.

In the said second method, after the chemical etching or electrochemical etching, during the process of rinsing out and desiccating, the semiconductor wafer is exposed to air, and adhesion thereon of minute dust particles and creation of a thin oxide layer are unavoidable, whereby establishing the metallic contact with the clean surface of the semiconductor is very difficult.

In view of these difficulties, W. Mehl et al. have reported in the Journal of Electrochemical Society Vol. 110, page 239, 1963, a new method of obtaining ohmic contact, that is, by the use of a gold-plating solution containing HF when making a gold-silicon eutectic alloy in the silicon body, first, the naturally produced thin oxide film on the surface of the semiconductor body is dissolved by the HF in the said solution, and then gold is plated on the surface to obtain good gold-silicon contact, after which, a gold-silicon eutectic alloy is made by heating the specimen to produce the ohmic contact.

The principle of this method of W. Mehl et al. may be outlined as follows. The alloying temperature becomes high if the intervening $SiO_2$ layer exists at the gold-silicon contact, and in order to avoid this, the $SiO_2$ film is removed in the first step, and, after thorough gold-to-silicon contact has been obtained, the alloying process is started, in which case the alloying temperature approaches the eutectic temperature.

SUMMARY OF THE INVENTION

In view of the above described difficulties of the prior methods, it is an object of the present invention to provide a new method of obtaining metal-to-semiconductor contact wherein these difficulties are overcome.

According to the present invention, there is provided a method of obtaining metal-to-semiconductor contact which, briefly described, comprises the following steps.

First, a semiconductor substrate with its surface oxidized by the thermal oxidation method in steam is prepared, and then the thickness of only a part of the oxide layer existing on the surface part of the sample onto which a metal region is to be metal-plated is rendered thinner than that of the other parts (by forming a concavity or hollow in the $SiO_2$ film). The semiconductor sample is then immersed for a specific time in a plating solution containing metal to be plated and a substance which will dissolve the oxide layer. This specific immersion time should be of a length which is sufficient to permit the oxide layer existing in the hollow to be completely dissolved which is not sufficient to permit any remaining portion of the oxide layer to be completely dissolved, whereby metal is deposited by plating on the clean surface portion of the semiconductor exposed after dissolution and removal of the oxide layer existing in the hollow.

It is important in the present invention that the semiconductor oxide layer in the hollow is so thinned that it is only dissolved completely while the oxide layer outside of the hollow will remain. During the above process, the metal contained in the solution is plated on the clean surface of the semiconductor sample exposed in the hollow where the oxide layer has been dissolved away.

The oxide layer in the hollow is not restricted to the semiconductor oxide; it may be a substance such as an insulating varnish or a metallic oxide, and this substance in the hollow may be of a composition different from that of the oxide layer outside of the hollow. For example, it may be a very thin oxide layer of the said semiconductor sample produced naturally in the air.

In this manner, it is possible to form a contact between a clean semiconductor surface and the metal at any selected part and of any shape on the semiconductor sample, at will, in the same solution without contact with the outside air. This is an indispensible condition for the production of semiconductor devices as described hereinafter.

Such a metal-to-semiconductor contact becomes rectifying or ohmic depending on the kind of metal and type of conductivity of the semiconductor. A rectifying contact is utilized as the emitter base or a collector-base barrier of a metal-base transistor and Schottky barrier diode, and an ohmic contact can be utilized as electrodes of the semiconductor devices in general, including the above-mentioned devices. The accompanying table shows the characteristics of metal-to-silicon contacts obtained by depositing various metals by plating according to the process of the present invention. Whether a contact become rectifying or ohmic depends on the work-function of the metal.

| Metal | Work-function of the contact | Silicon Wafer N-type | Silicon Wafer P-type |
|---|---|---|---|
| Al | 3.74eV | Ohmic | Rectifying |
| Zn | 3.74eV | " | " |
| In | 4.00eV | " | " |
| Pb | 4.02eV | " | " |
| Sn | 4.11eV | " | " |
| Cd | 3.92eV | Rectifying | Rectifying* |
| Sb | 4.08eV | " | "* |
| Co | 4.18eV | "* | " |
| Bi | 4.28eV | "* | " |
| Ag | 4.31eV | "* | " |
| Cu | 4.52eV | "* | " |
| Ni | 4.74eV | "* | " |
| Fe | 4.36eV | Rectifying | Ohmic |
| Au | 4.70eV | " | " |
| Rh | 4.65eV | " | " |
| Pt | 5.29eV | " | " |

*: Saturation current is small

In the above-mentioned plating solution, by applying an electric potential between the sample and another electrode immersed in the plating solution, making the former plus and the latter minus or vice versa, and passing electric current, it is possible to control suitably the etching speed and depositing rate and thickness of the plated layer. Especially in the case where the surface of the semiconductor within the hollow is contaminated by some metal, an excellent metal-to-semiconductor contact can be obtained by a procedure which comprises etching the semiconductor wafer surface, prior to plating, by a method such as that of applying a positive ( ) bias to the semiconductor wafer prior to plating to reduce the plating rate and increase the etching rate, thereby to expose a clean semiconductor surface, then reducing the positive bias potential applied to the semiconductor, or reversing the current direction, and carrying out metal-plating. In order to indicate more fully the nature and details of the present invention, the following detailed description with respect to typical examples of procedure is presented, reference being had to the accompanying drawing in which:

EXAMPLE 1.

Figure 1:
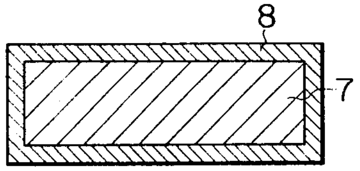
FIGS. 1 – 3 are vertical sectional views of different steps in the production of a semiconductor body illustrating one example of a structure in accordance with the present invention.
Figure 2:
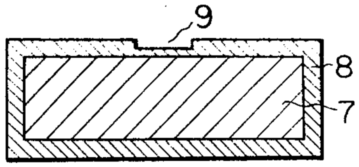
Figure 3:
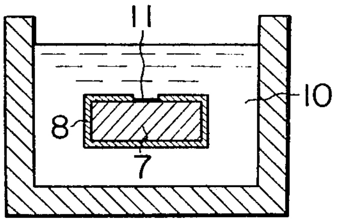

It will be appreciated that the figures of the devices shown in the drawing are materially 8,000 over that which would be used in actual of Referring to FIGS. 1–3 of the drawing, a silicon dioxide layer 8 of approximately 8,000 A thick is formed on the surface of an n-type silicon semiconductor body 1 having a specific resistance of 0.2–1 ohm-cm by thermal oxidation in steam. At a position on this layer 2, a hollow part 9 of 7,000 A thick is made by the well-known photoetching process. The sample 1 thus obtained is then immersed in a solution prepared by adding 0.47 gram of $HAuCl_4 \cdot 4H_2O$ to 100 cc. of an aqueous solution consisting of 50 cc. of water and 50 cc. of 46-percent HF, whereupon the $SiO_2$ immediately begins to be dissolved gradually by the HF. Since the oxide layer at the bottom of hollow is relatively thin, the semiconductor surface therebelow is exposed first.

Once the semiconductor surface is exposed, Au deposits on the surface of the silicon body because silicon has greater ionization tendency than Au, and Au-Si contact is obtained at the particular area 9 surrounded by the $SiO_2$ film. During this process, other parts of the $siO_2$ film also slowly become thin, but the operation is stopped before these parts are dissolved completely. In practice, an Au plating layer of 400 A thickness was formed by this process in 20 to 30 seconds.

Referring to FIG. 1, silicon oxide is evaporated to form a film 8 on a surface of a CdS wafer 7. The thickness of said film 8 is reduced at one or more places to form a hollow 9 or suitable number of hollows (FIG. 2). The specimen with a hollow or hollows is placed in a gold-plating solution 10 which contains gold to be plated and HF and HCl or $HNO_3$ enabling same to dissolve $SiO_2$ and CdS, so that after the thin film region of the $SiO_2$ layer existing in the hollow has been completely dissolved away but the remaining region of the layer 8 still exists, the exposed surface of CdS is partially etched, whereby a metal gold layer 11 is deposited on only the clean surface region of the CdS wafer then etched selectively.

EXAMPLE 2.

Figure 4:
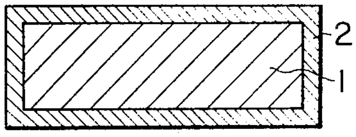
FIGS. 4–7 are vertical sectional views of different steps in the production of a silicon body illustrating another application of the instant invention.
Figure 5:
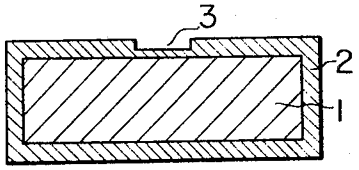
Figure 6:
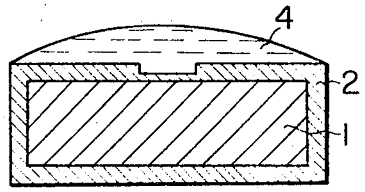
Figure 7:
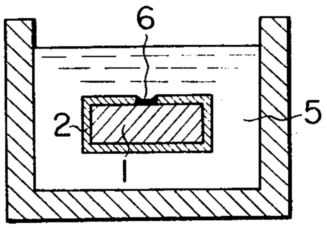

A silicon oxide layer 2 of 0.6-micron thickness is formed on the surface of a silicon body 1 by thermal oxidation in steam (FIG. 4). By a well-known photoetching process, the thickness of the said oxide layer 2 in an area of 0.2-mm diameter is reduced to about 0.1 micron to form a hollow 3 (FIG. 5). The upper surface of said oxide layer is coated or immersed in a HF aqueous solution 4 of 50 percent concentration for about 10 seconds which is the time that is sufficient to dissolve the part of the oxide layer existing in the hollow 3 (FIG. 6), and then the body 1 thus covered with the solution 4 on the upper surface thereof is dipped promptly into plating solution 5 so that the upper surface portion of said body exposed in the hollow covered by the said HF water solution is prevented from being contacted to air, whereupon a Ni plated layer 6 is obtained on only the exposed surface of the silicon body in the hollow (FIG. 7).

In this process, a saturated solution containing 200 grams of $NiSO_4\,(NH_4)_2SO_4 \cdot 6H_2O$, 30 grams of $NH_4Cl$ and 30 grams of $H_3BO_3$ in 1 liter pure water is suitable as a plating solution.

In actual instance, a Ni plated layer of 0.1-micron thickness was obtained by electroplating in this plating solution, with an electric potential causing the electrode in the plating solution to be plus and the silicon body to be minus, by an electric current of 20 $mA/cm^2$ passed for 20 seconds.

In this case, the aqueous solution of hydrogen fluoride necessary for the etching purpose can be of a small quantity and mixing of this HF liquid with the above-mentioned nickel-plating solution does not give mal-effect to this plating solution. However, it is preferable that this HF liquid be diluted with water before the semiconductor body coated with the liquid is immersed in a metal-plating solution without exposing the etched surface to air, or, the said liquid be completely rinsed with water so as to be replaced with it. This dilution or replacement of the liquid with water is all the more desirable in the case of the said plating solution having the property of being decomposed with acid, such as, for example, a gold-plating solution containing AuCN or the like.

The foregoing examples are illustrative of only a part of the possible embodiments of the present invention.

Examples of semiconductor materials of bodies to which the invention can be applied are Ge, Si, CdS, GaAs, InSb, ZnS, PbS, SiC, $Bi_2Te_3$, CdSe, CdTe, GaSb, InAs, PbSe, PbTe, ZnSe, ZnTe, and $Bi_2Se_3$. For the insulating oxide layer of these semiconductor bodies, the oxides of these semiconductor materials, particularly SiO and $SiO_2$ are most suitable; besides, GeO, $GeO_2$ are also applicable. In addition, oxides of metal, such as $Al_2O_3$, ZnO, CdO, NiO, $Ni_2O_3$, $Cr_2O_3$, PbO, $Ga_2O_3$, MgO, $MgO_2$, $In_2O_3$, $In_2O$, $PbO_2$, BeO, etc. are suitable.

Of the above-mentioned oxides of the semiconductor and metal, SiO and $SiO_2$ are dissolved by a liquid containing at least hydrogen fluoride; $GeO_2$, GeO, $Al_2O_3$, NiO, $Ni_2O_3$, $Cr_2O_3$, ZnO, PbO, and $Ga_2O_3$ are dissolved by either acids or alkalis; CdO and MgO are dissolved by a liquid containing either acids or ammonium salts; $MgO_2$ and $In_2O_3$ are dissolved by acids; $In_2O$ and $PbO_2$ are dissolved by hydrochloric acid; and BeO is dissolved by concentrated sulfuric acid.

Examples of substances contained in the plating electrolyte are as follows:

| | |
|---|---|
| $AuCl_3$, $HAuCl_4$, AuCN | in Au plating; |
| $CuSO_4$, $CuCl_2$ | in Cu plating; |
| AgF, $AgNO_3$ | in Ag plating; |
| $AlCl_3$, $AlI_3$ | in Al plating; |
| $In(NO_3)_3$, $In(SO_4)_3$ | in In plating; |
| $NiCl_2$, $NiSO_4$, NiSiF, $NiSO_4(NH_4)_2SO_4$ | in Ni plating; and |
| $PbSiF_6$, $Pb(BO_2)_2 \cdot H_2O$ | in Pb plating. |

The advantageous features of the method of the present invention may be enumerated as follows.

1. As compared with the method wherein cleaving and evaporation are used, the size and shape of the semiconductor wafer can be controlled more easily, and their choice and application can be freely made.
2. It is very difficult to deposit metal by evaporation on the cleaved surface locally and selectively, because it necessitates adjustment of an evaporation mask for alignment precisely to the cleaved surface.

By applying the method of the present invention, however, by making the thick and thin parts in advance in the semiconductor oxide layer, etc., a part or parts of any shape or area of metallic film and semiconductor body can be easily and selectively contacted together.

3. When plating or evaporation is carried out after mere etching, it has been entirely impossible to prevent the once cleaned surface from being covered again by an oxidized layer before metal deposition. By the method of the present invention, however, etching and plating can be achieved simultaneously, and the plating of a metal on the clean semiconductor surface can be accomplished successfully.

4. By the method of the present invention, for the same reason as mentioned above, it is possible to prevent adhesion of fine dust and other impurities on the semiconductor-to-metal contact face.

On the basis of the above-mentioned reasons, metal-to-semiconductor contacts made by the method of the present invention are free from substances interposed between the metal and the semiconductor, and by properly selecting the combination of the kind and conductivity of the semiconductor and kind of the metal, it is possible to obtain good contact of rectifying or ohmic characteristic which is determined theoretically. The former contact exhibits electrical characteristics suitable for emitter base barriers and collector-base barriers of metal-base transistors and Schottky barrier diodes, and the latter contact exhibits suitable characteristics for ohmic contacts of semiconductor devices in general.

It should be understood, of course, that the foregoing disclosure relates to only particular embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A method for producing semiconductor devices which comprises the steps of:
coating the exterior surface of a semiconductor body with an electrically insulating film;
reducing the thickness of said film at a predetermined portion thereof; and
immersing said semiconductor body so processed in a metal-plating solution containing a solvent capable of dissolving said insulating film, for a time period sufficient to dissolve and remove completely said film at a portion of reduced thickness thereof but unsufficient to remove the remaining film portion, thereby exposing the uncovered surface of said semiconductor body to said metal-plating solution to form a plated metal layer on said uncovered surface.

2. A method for producing semiconductor devices having metal-to-semiconductor contacts comprising the steps of:
providing on a semiconductor body a single layer of an electrically insulating film having a relatively thin hollow part therein; and
immersing said semiconductor body with said film into a mixture of a metal-plating solution and an etching solution containing a solvent capable of dissolving the insulating film, for a period of time, during which said insulating film is dissolved to such an extent as to expose a surface portion of the semiconductor body at said hollow part only and the metal in the metal-plating solution is plated on said exposed surface of the semiconductor body, thereby to obtain a metal-to-semiconductor contact, and withdrawing said semiconductor body from said mixture prior to the dissolving of the remaining part of said film.

3. A method for producing semiconductor devices having metal-to-semiconductor contacts comprising the steps of:
providing an electrically insulating film on a surface of a semiconductor body;
reducing the thickness of said insulating film at a predetermined portion thereof to form a hollow part thereon; and
immersing said semiconductor body in a metal-plating solution containing metal to be plated and a solvent capable of dissolving said insulating film, for a period of time, during which said solvent dissolves said insulating film to such an extent as to expose the surface of the semiconductor body underlying the hollow part and the metal contained in the solution is electroplated on the surface of the semiconductor body so exposed, thereby to obtain a metal-to-semiconductor contact without dissolving the remaining part of said film.

4. A method according to claim 3, in which said step of reducing the thickness of the insulating film comprises the step of photoetching the insulating film at the preselected portion thereof.

5. A method according to claim 3, in which said insulating film is formed by evaporative deposition.

6. A method for producing semiconductor devices which comprises the steps of:
coating the exterior surface of a semiconductor body with an electrically insulating film;
forming in said insulating film at a specific portion on said body at least one hollow part of relatively thinner thickness than the thickness of the remaining part of the insulating film other than said hollow part;
covering the entire surface of said insulating film with a liquid having a property capable of dissolving said insulating film until only said hollow part of said film is completely dissolved so as to expose a surface portion of said body underneath the hollow part to the liquid; and then
immersing into a metal-plating solution said semiconductor body whose surface is covered by said liquid without contacting the thus exposed surface portion of said semiconductor body to air so as to carry out metal-plating only on said surface portion so exposed.

7. A method according to claim 6, wherein said semiconductor body is silicon and said insulating film is silicon oxide formed through thermal oxidation of the semiconductor body in steam.

8. A method for producing semiconductor devices having metal-to-semiconductor contacts comprising the steps of:
preparing a semiconductor body covered with an electrically insulating film;
reducing the thickness of said film at a predetermined region of said body;
covering the resulting predetermined region of reduced thickness of the insulating film by a liquid capable of dissolving said insulating film until the liquid completely dissolves the film in said predetermined region; and then
immersing in a metal-plating solution said semiconductor body covered by said liquid without causing the semiconductor surface at said predetermined region to be exposed to air until a metal layer is formed through plating on said surface of the semiconductor body so exposed.

9. A method according to claim 8, wherein said semiconductor body is silicon and said insulating film is silicon oxide formed through thermal oxidation of the surface of the semiconductor body in steam.

* * * * *